United States Patent
Wu et al.

(10) Patent No.: US 10,455,604 B2
(45) Date of Patent: Oct. 22, 2019

(54) REGRET BENEFIT RATIO LINK SCHEDULER FOR WIRELESS BACKHAUL WITH DIRECTIONAL ANTENNAS

(71) Applicant: University of Florida Research Foundation, Incorporated, Gainesville, FL (US)

(72) Inventors: Dapeng Oliver Wu, Gainesville, FL (US); Yun Zhu, Gainesville, FL (US); Jiade Li, Gainesville, FL (US); Qiuyuan Huang, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 0 days.

(21) Appl. No.: 15/865,568

(22) Filed: Jan. 9, 2018

(65) Prior Publication Data
US 2018/0206255 A1    Jul. 19, 2018

Related U.S. Application Data

(60) Provisional application No. 62/446,558, filed on Jan. 16, 2017.

(51) Int. Cl.
*H04W 72/12* (2009.01)
*H04B 7/024* (2017.01)
*H04W 72/04* (2009.01)

(52) U.S. Cl.
CPC ....... *H04W 72/1226* (2013.01); *H04W 72/12* (2013.01); *H04W 72/1242* (2013.01); *H04W 72/1247* (2013.01); *H04B 7/024* (2013.01); *H04W 72/046* (2013.01)

(58) Field of Classification Search
CPC ............. H04W 72/1226; H04W 72/12; H04W 72/1247; H04W 72/1242; H04W 72/046; H04B 7/024
See application file for complete search history.

(56) References Cited

U.S. PATENT DOCUMENTS 6,262,980 B1 * 7/2001 Leung ................. H04L 41/0896
370/336
2003/0214914 A1 * 11/2003 Cain .................... H04B 7/0491
370/252

OTHER PUBLICATIONS

Mobility_aware Caching Scheduling for Frog Computing in mmWave band, Niu et al. (Year: 2017).*
On the performance of Multiuser MIMO Mesh Networks by Bahadori et al. (Year: 2008).*
Regret Benefit Ratio Link Scheduler for Wireless Backhaul with Directional Antennas (Year: 2017).*
(Continued)

*Primary Examiner* — Dady Chery
(74) *Attorney, Agent, or Firm* — Alston & Bird LLP (57) ABSTRACT

A wireless system can include a plurality of directional antennas and a scheduler scheduling multiple links between the plurality of directional antennas. The scheduler can schedule the multiple links concurrently in the same time slot based on Regret Benefit Ratio (RBR). The RBR is a single indicator combining contention for one of the directional antennas and Quality of Service (QoS). The scheduler can introduce a contention graph for the directional antennas that capture a global knowledge of interference.

20 Claims, 5 Drawing Sheets

(56) References Cited

OTHER PUBLICATIONS

Increasing Indoor Wireless Capacity Using Directional Antennas, by Liu et al. (Year: 2008).*
NS-3, "NS-3," 2015, [accessed Oct. 13, 2015]. [Online]. Available: https://www.nsnam.org/, retrieved Ns-3.24 Notes and Ns-3.24.1 Errata on Sep. 21, 2018, 29 pages.
Baldemair et al., "Ultra-dense networks in millimeter-wave frequencies," IEEE Communications Magazine, Jan. 2015, pp. 202-208.
Taori et al., "Point-to-multipoint in-band mmWave backhaul for 5G networks," IEEE Communications Magazine, Jan. 2015, pp. 195-201.
Toyoda et al., "Reference antenna model with side lobe for TG3c evaluation," IEEE P802.15 Working Group for Wireless Personal Area Networks (WPANs), Nov. 2006, pp. 1-13.
Son et al., "On frame-based scheduling for directional mmWave WPANs," 2012 Proceedings IEEE INFOCOM, Mar. 2012, pp. 2149-2157.
Islam et al., "Wireless backhaul node placement for small cell networks," 2014 48th Annual Conference on Information Sciences and Systems, Mar. 2014, pp. 1-6.
Wang et al., "Beam codebook based beamforming protocol for multi-Gbps millimeter-wave WPAN systems," IEEE Journal on Selected Areas in Communications, Sep. 2009, pp. 1-6.
Qiao et al., "Enabling device-to-device communications in Millimeter-Wave 5G cellular networks," IEEE Communications Magazine, Jan. 2015, pp. 209-215.
Niu et al., "Exploiting device-to-device communications in joint scheduling of access and backhaul for mmWave small cells," IEEE Journal on Selected Areas in Communications, May 2015, pp. 1-16.
Cai et al., "REX: A randomized exclusive region based scheduling scheme for mmWave WPANs with directional antenna," IEEE Transactions on Wireless Communications, Jan. 2010, pp. 113-121, vol. 9, No. 1.
Qiao et al., "Enabling multi-hop concurrent transmissions in 60 GHz wireless personal area networks," IEEE Transactions on Wireless Communications, Nov. 2011, pp. 3824-3833, vol. 10, No. 11.
Qiao et al., "STDMA-based scheduling algorithm for concurrent transmissions in directional millimeter wave networks," 2012 IEEE International Conference on Communications, Jun. 2012, pp. 5221-5225.
Geng et al., "Millimeter-wave propagation channel characterization for short-range wireless communications," IEEE Transactions on Vehicular Technology, Jan. 2009, pp. 3-13, vol. 58, No. 1.
Akdeniz et al., "Millimeter wave channel modeling and cellular capacity evaluation," IEEE Journal on Selected Areas in Communications, Jun. 2014, pp. 1164-1179, vol. 32, No. 6.
Zheng et al., "Distributed opportunistic scheduling for ad hoc networks with random access: an optimal stopping approach," IEEE Transactions on Information Theory, Jan. 2009, pp. 205-222, vol. 55, No. 1.
Gong et al., "A directional CSMA/CA protocol for mmWave wireless PANs," 2010 IEEE Wireless Communications and Networking Conference, Apr. 2010, pp. 1-6.
Gong et al., "Directional CSMA/CA protocol with spatial reuse for mmWave wireless networks," 2010 IEEE Global Telecommunications Conference, Dec. 2010, pp. 1-6.
Lee et al., "A dynamic CAP allocation algorithm using directional antennas in IEEE 802.15.3c WPANs," 2011 13th International Conference on Advanced Communication Technology, Feb. 2011, pp. 296-299.

* cited by examiner

Figure 1

Figure 2(a)    Number of successful links

Figure 2(b)    System throughput

Figure 3(a)   Number of successful links

Figure 3(b)   System throughput

Figure 4(a)  Number of successful links

Figure 4(b)  System throughput

Figure 5(a) Number of successful links

Figure 5(b) System throughput

US 10,455,604 B2

REGRET BENEFIT RATIO LINK SCHEDULER FOR WIRELESS BACKHAUL WITH DIRECTIONAL ANTENNAS

CROSS-REFERENCE TO RELATED APPLICATION

This application claims the benefit of U.S. Provisional Application Ser. No. 62/446,558, filed Jan. 16, 2017, which is incorporated herein by reference in its entirety, including any figures, tables, and drawings.

BACKGROUND

Mobile data demand is growing explosively. Some industry and academic experts predict a 1000-fold demand increase by 2020 [1]. In order to offer the 1000× increase in data rates and throughput, small cells densely deployed underlying the conventional homogeneous macrocells are emerging as a promising candidate for the fifth generation (5G) mobile broadband [2]. This new network deployment is usually referred to as heterogeneous cellular networks (HCNs). However, with the increase of the number of small cells deployed, the backhaul for small cells becomes a significant challenge [2], [3]. Although fiber based backhaul offers large bandwidth, it is costly, inflexible, and time-consuming to connect the densely deployed small cells. In contrast, wireless backhaul is more cost-effective, flexible, and easier to deploy [3]. With huge bandwidth available, wireless backhaul in mmWave bands, such as the 60 GHz band and E-band (71-76 GHz and 81-86 GHz), provides several-Gbps data rates and can be a promising backhaul solution for small cells.

BRIEF SUMMARY

Embodiments of the subject invention provide novel and advantageous wireless network systems that include a Regret Benefit Ratio Scheduler (RBRS) using a Regret Benefit Ratio (RBR) as an indicator.

In an embodiment, a wireless system can include a plurality of directional antennas, and a scheduler scheduling multiple links between the plurality of directional antennas, wherein the scheduler schedules the multiple links concurrently in the same time slot based on RBR.

In another embodiment, a distributed network system can include a pair of directional antennas facing each other and providing a link configured to transmit data from source to destination, a beacon coordinating the pair of directional antennas, and a scheduler adjusting a back-off window for the link with RBR and collecting a contention information.

DETAILED DESCRIPTION

Embodiments of the subject invention provide novel and advantageous Regret Benefit Ratio Schedulers (RBRSs) using a Regret Benefit Ratio (RBR) as an indicator that can be applied in both centralized and distributed network systems. By combining contention and QoS into a single indicator of RBR, the network system can maximize the number of links and satisfy their Quality of Service (QoS) requirements.

With huge bandwidth available in the mmWave band, wireless backhaul at mmWave frequencies can be a promising backhaul solution for small cells densely deployed underlying the homogeneous macrocells in 5G networks. With multiple links under such mmWave wireless networks, it is desired to have a scheduling mechanism that can effectively improve the capacity of a network with the QoS considered. Embodiments using the RBRS are able to maximize the number of links with their QoS requirements satisfied. The new indicator, which is called the RBR, merges two objective functions, which are 1) maximizing the QoS benefit and 2) minimizing contention among links under directional antennas. Embodiments design the RBRS for a time slot based centralized control mmWave network in which the embodiments utilize the RBR to find a suitable concurrent transmission links for every single time slot. Furthermore, the subject invention is applied to a distributed scheme under CSMA/CA, which implements the RBR by prioritizing MAC contention window to provide better concurrent transmission support while achieving QoS-aware capability.

The RBRSs of embodiments the subject invention are able to maximize the number of concurrent transmissions with their QoS requirements satisfied. In particular, the indicator RBR allows the network system to simultaneously maximize the QoS benefit and minimize contention among links under directional antennas.

Unlike existing communication systems using lower carrier frequencies (e.g., from 900 MHz to 5 GHz), mmWave communications suffer from high propagation loss. To combat severe channel attenuation, directional antennas are utilized at both the transmitter and receiver for high antenna gain. With the beamforming technique, the transmitter and the receiver are able to direct their beams towards each other for the directional communication. The directional communication reduces the interference between links, and concurrent transmissions (spatial reuse) can be exploited to greatly improve network capacity. In a scenario where small cells are densely deployed, effective and efficient backhaul scheduling schemes need to be designed with the characteristics of mmWave communications taken into account.

Figure 1:
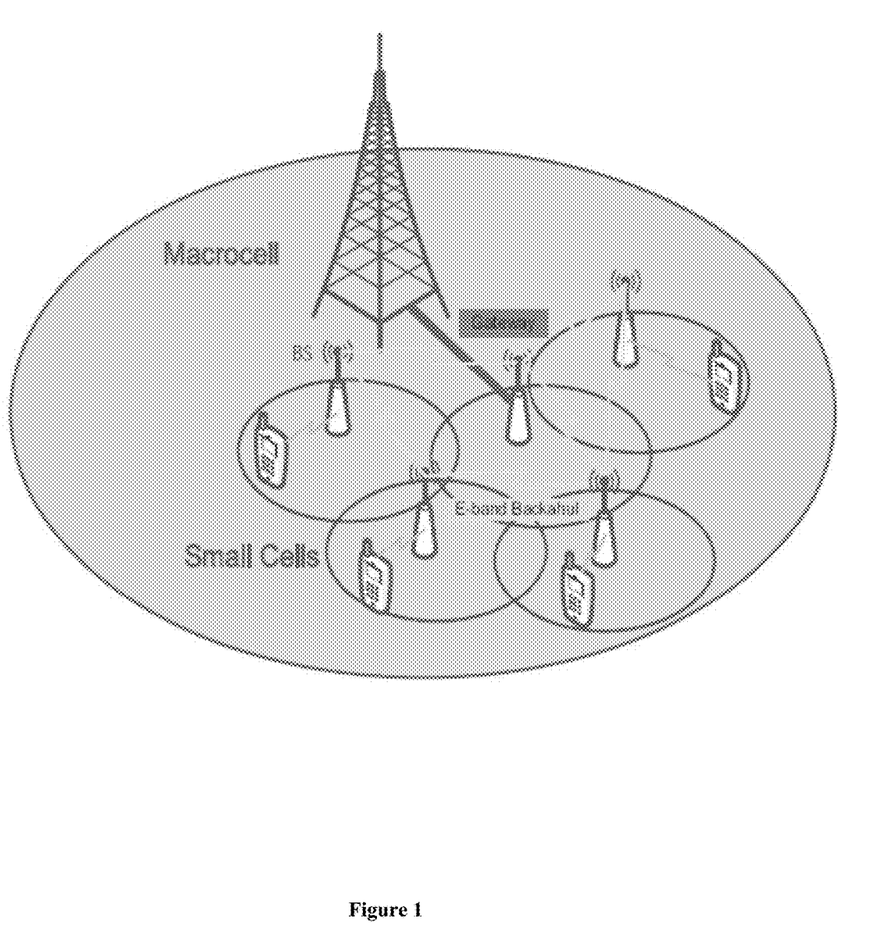
FIG. 1 shows a mesh backhaul network in small cells densely deployed scenario.

FIG. 1 shows a mesh backhaul network in small cells densely deployed scenario. In particular, FIG. 1 shows a typical scenario of densely deployed small cells underlying the macrocell cellular network. In the small cells, mobile users are associated with the base stations (BSs), and the BSs are connected via backhaul links with the mesh topology. There are one or more BSs connected to the backbone network via the macrocell site, which are called gateways. In this targeted small cells system, the backhaul network is in the E-band, which provides high data rates. For the scheduling problem of the backhaul network for small cells densely deployed, there are two main challenges. In the first, concurrent transmissions need to be fully exploited to maximize the spatial reuse gain. In the second, the scheduling scheme should provide the quality of service (QoS), which is either guaranteed or desired throughput, for each link in the backhaul network. However, the two objectives cannot be satisfied at the same time, which further complicates this problem.

By contrast, embodiments of the subject invention include the RBRS for two different MAC layers. The RBRS provides optimal scheduling to maximize the number of links with their QoS requirements satisfied in the slot based mmWave network as a nonlinear integer programming problem. In addition, a heuristic scheduling algorithm is provided to solve this with low complexity. Specifically, the two primary objectives, maximizing the QoS and minimizing contention under directional antenna, are combined into a single objective function, which is summarized as the RBR. By utilizing this concept, a suitable concurrent group of links can be scheduled at single time slot and the total network throughput can be greatly improved.

In order to make the RBRS practical for wider usage scenarios, embodiments of the subject invention provide an extended implementation of it, the Distributed Regret Benefit Ratio Scheduler (D-RBRS), that can be deployed on CSMA/CS based network systems without much effort. Embodiments can redefine the Regret and Benefit under the distributed setting, and a Coarse-to-Fine window mapping algorithm is exploited to bridge the RBR with back-off window. Same as centralized version, the D-RBRS optimizes both QoS and contention.

Embodiments are evaluated for protocols for slot based and CSMA/CS based network respectively under the 73 GHz band. In embodiments of the subject invention, different evaluation metrics and simulation results demonstrate up to 60% performance gain for slot based settings and 30% gain for CSMA scenario respectively compared with other existing schemes.

Time division multiple access (TDMA) has been a widely used solution for mmWave backhaul, including use of time-division multiplexing (TDM) based scheduling schemes to support point-to-multipoint, non-line-of-sight, mmWave backhaul. Joint cost optimal aggregator node placement, power allocation, channel scheduling, and routing to optimize the wireless backhaul network in mmWave bands has also been performed. Scheduling for the radio access and backhaul networks have been jointly designed. No existing methods are devoted to address the balance between the QoS requirement and the contention between links in the mmWave network. On the other hand, similar problems have also been investigated in WPANs. One influential work is the Exclusive Region (ER) based scheduling, which ensures that concurrent transmissions always outperform the serial TDMA by co-scheduling links in the exclusive region. A concurrent transmission scheduling with the QoS requirements of links has also been performed, in which a set of concurrent links are chosen in a greedy manner to maximize the overall system throughput, through which the number of links successfully scheduled is maximized. However, the global information of the contentions residing in the network has not fully utilized under existing works. Most importantly, related art methods avoid addressing the implicit connection and trade-off between minimizing contention and maximizing QoS. Embodiments of the subject invention introduce the concept of the RBR to the scheduling problem under mmWave bands. This new indicator considers both the global contention information as well as QoS benefit, and perfectly combines them. With these advantages, the RBR Scheduler can find better concurrent transmission links than existing solutions.

The slot-based nature of related art methods poses a big disadvantage that they all heavily rely on centralized backhaul network controller to coordinate scheduling process. Applying CSMA contention based scheduling on 60 GHz mmWave band has been performed, as has a directional CSMA/CA protocol designed specifically for 60 GHz WPANs. The latter adopts virtual carrier sensing and relies on a central coordinator to distribute network allocation vector (NAV) information. Related art methods only target on channel access control and generally lack QoS support. Thus they cannot be applied to QoS-aware backhaul networks. By contrast, the D-RBRS of embodiments of the subject invention is the CSMA contention based scheduling protocol that prioritizes the MAC contention window to better facilitate both concurrent transmission and QoS support.

Embodiments of the subject invention consider the scenario where small cells are densely deployed, and assume there is a backhaul network controller (BNC) residing on one of the gateways. Each BS in the network is equipped with an electronically steerable directional antenna, and can direct its beam towards other BSs for directional transmission. In the system, time can be partitioned into superframes, and each superframe includes M time slots referred to as channel time allocation (CTA). Embodiments further assume the transmission requests and signaling information for mmWave backhauling are collected by the 4G BS by its reliable transmission. Thus, the BNC is able to obtain the transmission requests and the location information of other BSs. In the scheme, with directional transmission, multiple links can be scheduled concurrently in the same time slot, which can also be referred to as the spatial-time division multiple access (STDMA).

In an embodiment of a CSMA-based version, the system can operate in a completely distributed fashion and does not need a centralized controller to coordinate link scheduling. Before data transmission from source to destination within a link, the pair of directional antennas should face to each other. This is coordinated by extra beacons, which use different channels. Due to this reason, omni-directional antenna is also equipped for beacon transmissions.

Because non-line-of-sight (NLOS) transmissions suffer from higher attenuation than line-of sight (LOS) transmissions, it can be assumed that the directional LOS transmission between BSs can be achieved with the locations of BSs adjusted appropriately (e.g., on the roof). It can be assumed that there are N links requesting transmission slots in the superframe, and each link represents one backhaul link. The distance between the transmitter $s_i$ of link i and the receiver $r_j$ of link j can be denoted by $d_{ij}$. The antenna gain of $s_i$ in the direction of from $s_i$ to $r_j$ can be denoted by $G_t(i; j)$, and the antenna gain of $r_i$ in the direction of from $s_j$ to $r_i$ by $G_r(j; i)$.

Then, considering the path loss and signal dispersion over distance, the received power at the receiver $r_i$ from $s_i$ can be calculated as $$P_r(i,i) = k_0 G_t(i,i) G_r(i,i) d_{ii}^{-n} P_t \quad (1)$$

where $k_0$ is a constant coefficient and proportional to $$\left(\frac{\lambda}{4\pi}\right)^2$$

($\lambda$ denotes the wavelength), n denotes the path loss exponent, and $P_t$ denotes the transmission power. Due to the half-duplex assumption, adjacent links cannot be scheduled for concurrent transmissions. If link i and link j are not adjacent, it can be denoted by $i \propto j$. Then under concurrent transmissions, the received interference at $r_i$ from $s_j$ can be calculated as $$P_r(j,i) = p k_0 G_t(j,i) G_r(j,i) d_{ji}^{-n} P_t \quad (2)$$

where is the multi-user interference (MUI) factor related to the cross correlation of signals from different links. According to the Shannon's channel capacity, the achievable data rate of link i can be estimated as $$R_i = nW \log_2\left(1 + \frac{P_r(i,i)}{N_0 W + \Sigma_{j \alpha i} P_r(j,i)}\right) \quad (3)$$

where W is the bandwidth, and $N_0$ is the one-sided power spectra density of white Gaussian noise. $n \in (0, 1)$ describes the efficiency of the transceiver design.

In embodiments of the subject invention, the optimal scheduling problem can be formulated into a nonlinear integer programming problem. It can be assumed that there is a minimum throughput requirement for each link i, and denote it by $q_i$. A schedule can be denoted as S, and assume it has K stages. In each stage, multiple links are scheduled for concurrent transmissions. For each link i, a binary variable $a_i^k$ can be defined to indicate whether link i is scheduled in the kth stage. If so, $a_i^k=1$; otherwise, $a_i^k=0$. The number of time slots of the kth stage can be denoted by $\delta^k$.

Since there are different links in different stages, the transmission rate of link i in the kth stage can be denoted by $R_i^k$. Then $R_i^k$ can be obtained as $$R_i^k = nW \log_2\left(1 + \frac{a_i^k k_0 G_t(i,i) G_r(i,i) d_{ii}^{-n} P_t}{N_0 W + p\Sigma_j a_j^k k_0 G_t(j,i) G_r(j,i) d_{ji}^{-n} P_t}\right). \quad (4)$$

Then the throughput of link i can be obtained based on S as $$T_i = \frac{\Sigma_{k=1}^K \delta^k \cdot R_i^k \cdot t_{slot}}{t_0 + M \cdot t_{slot}} \quad (5)$$

where $t_0$ is the time duration of collecting transmission requests and signaling information, and $t_{slot}$ is the time duration of each time slot in the CTA period (CTAP). Then a binary variable Qi can be defined to indicate whether the QoS requirement of link i is satisfied in S. If so, $Q_i=1$; otherwise, $Q_i=0$. Given the throughput requirements of links, with the limited number of time slots in the CTAP, the optimal schedule should accommodate as many links as possible. Therefore, the optimal scheduling problem P1 can be formulated as follows.

$$(P1) \max \sum_{i=1}^{N} Q_i \quad (6)$$

s.t.

$$Q_i = \begin{cases} 1, & \text{if } T_i \geq q_i, \\ 0, & \text{otherwise} \end{cases} ; \forall i \quad (7)$$

$$\sum_{k=1}^{K} \delta^k \leq M; \quad (8)$$

$$a_i^k + a_j^k \leq 1, \text{ if flow } i \text{ and } j \text{ are adjacent}; \forall i, j \quad (9)$$

This is a nonlinear integer programming problem, and is NP-hard. Constraint (7) indicates if the throughput of link i in the schedule is larger than or equal to its throughput requirement, $Q_i=1$; otherwise, $Q_i=0$. Constraint (8) indicates there are at most M time slots in the CTAP. Constraint (9) indicates due to the half-duplex operation of B Ss, adjacent links cannot be scheduled for concurrent transmissions since there is at most one connection for each node.

Because it is difficult to solve the problem of P1 in polynomial time, an efficient and practical scheduling algorithm can be used.

Embodiments of the subject invention provide the Regret Benefit Ratio Scheduler for problem P1. The key issue for scheduling is to find a combination of links that are suitable for concurrent transmission. It requires those links have minimal internal interference and are beneficial for QoS achievement. In the algorithm, links in a concurrent set at one time slot are selected based on our new metric regret benefit ratio. To present the overall scheduling algorithm, the contention graph can be introduced under directional antennas, which captures the global knowledge of interference; Then, priority for each link can be defined out of the consideration of QoS requirement; After that, definition can be given for regret benefit ratio, which combines contention and QoS into single indicator. With this new indicator, the algorithm can be presented for finding concurrent set. For the sake of convenience, some mathematical notations are summarized in Table I.

TABLE I

| MATHEMATICAL NOTATIONS | |
| --- | --- |
| G | contention graph |
| v | vertex in the graph |
| $p_v$ | priority of vertex |
| V (G) | vertex set |
| E(G) | edge set |
| W(G) | sum of the weights of all vertices |
| N(G) | the number of vertices in the graph |
| $N_G(V)$ | the neighbors set of vertex v |
| $N^+$ | v and its neighbors set |
| d(v, G) | degree of vertex v |

With respect to the contention graph, the RBRS summarizes the global interference information in the contention graph, in which a node represents a real link and an edge between a pair of nodes marks the contention. The existence of contention between every pair of links can be judged based on two principles: 1) the half duplex nature where a single BS cannot receive and transmit packets at the same time. In other words, if two links share the same source or destination, there will be a contention edge between them; 2) the impact that one link has on another. For every link pair, embodiments define the relative-interference (RI) as follows:

$$RI_{j,i} = \frac{P_r(j, i)}{P_r(i, i)} \quad (10)$$

where $P_r(j; i)$ and $P_r(i; i)$ is defined by (2) and (1) respectively. An edge can be inserted between link i and link j if max $(RI_{i,j}; RI_{j,i}) > \sigma$, where $\sigma$ is a threshold.

With respect to the QoS-aware priority, a priority value can be assigned to each link out of QoS considerations. Links that can achieve requested throughput more quickly are preferred in our scheduling because they can soon stop transmission and leave time slots for others to use. To give more weight to those links, the priority can be defined as the inverse of the number of slots that a link needs in CTAP to achieve its QoS requirement. Based on previous definitions, the priority value of link v can be expressed as follows:

$$P_v = \frac{R_v}{q_v} \quad (11)$$

where $$R_i = nW\log_2\left(1 + \frac{P_r(i, i)}{N_0 W}\right). \quad (12)$$

This definition is the ratio of actual achievable throughput and required one. In other words, if one link has much higher chance to achieve what is required, it has more priority value.

With regard to the RBR for each link, a metric may be needed to incorporate both the contention graph and the QoS priorities of the links. Once a node is picked, the neighbors of it will not be picked again due to contention between them. In other words, to maximize the QoS priority of the scheduling, one should always pick the node that has the large priority value while that of its neighbors are small. To achieve that, the two objective functions can be combined into a single one, which maximize the benefit while minimize the regret of its neighbors at the same time. This metric can be mathematically formulated as follows:

$$r_v = \frac{\sum_{i \in N_G(v)} P_i}{P_v} \quad (13)$$

where $r_v$ is the regret benefit ratio, and $N_G(v)$ is the neighbor set of node v.

With regard to finding concurrent set, with regret benefit ratio defined above, the algorithm can be formulated to find a suitable concurrent set at every single time slot. In the RBRS, the set of links scheduled at any slot should be a QoS-aware independent set. Obviously when some links achieve QoS requirement and are removed from current scheduling, this condition may no longer be satisfied. When this happens, links can be selected from contention graph G to add to the current scheduling set to generate a new concurrent set.

To begin with, the "unqualified" links from which the method will not select should be removed from G. A link is "unqualified" if it satisfies one of the following conditions: 1) it has already achieved QoS requirement so there is no need to consider it; 2) it has been scheduled and thus ongoing now; or 3) it is a neighbor of one of the ongoing links. The third condition comes from the fact that neighbors in G should never appear together in the independent set.

Then, the node (or link) with smallest RB ratio can be iteratively selected from the remaining graph and added to the scheduling set. In this way, the total priority values within the scheduled set can be maximized in a greedy manner. This step is summarized in Equation (14). Once the node is picked, the chosen node and its neighbors in G can be removed, and the next one can be selected as long as the remaining contention graph is not empty.

The detailed algorithm is summarized in Algorithm 1. Embodiments use s to denote the scheduling set. In this algorithm, the existing scheduling set can be used as the input and generate a new one.

---

Algorithm 1

FindConcurrentSet

Input:
   existing schedule set s
Output:
   new scheduling set, s;
1: remove unqualified links from G
2: while G ≠ ∅ do 3: $\;\; \upsilon = \min_{\upsilon \in G} r_\upsilon$ 4:    s := s ∪ {υ}
5:    G := G[V(G) − $N_G^+$(υ)]
6: end while
7: return s

---

Before the scheduling among links, admission control is exploited to get rid of links that are never able to achieve its QoS requirement. In computing priority in Equation (11), embodiments seek the number of slots that are needed to transmit all bits. When the number is larger than all the number of slots within a superframe, this link can be rejected and will not be considered in scheduling.

In summary, after the BNC receives QoS requests from BSs, it will construct the contention graph G and make scheduling decisions. According to (4) and (5), the slots can be divided into a number of stages during which the same scheduling is kept. In the RBRS, the end of one stage is the slot in which some scheduling links have achieved QoS requirement. Those links is called as "finished". In other words, the method should check at every slot if there are some newly finished links, and if so, a new concurrent set should be found using Algorithm 1.

For N links and M slots in CTAP, embodiments use a N*M binary matrix B to denote the final scheduling S, where B(i,j)=1 means the link i at slot j is scheduled. The detailed process is shown in Algorithm 2. The initialization steps are among line 1-5. In line 6-12, Algorithm 1 can be called to generate the new scheduling array whenever needed. In line 10, embodiments will denote the scheduling set s as a vector and then assign it to B.

| Algorithm 2 Regret Benefit Ratio Scheduler |
| --- |
| 1: BNC receives transmission request $r_i$ (i = 1, 2, ...N) requiring minimum throughput $R_{min}^i$ |
| 2: construct contention graph G |
| 3: compute p for links |
| 4: do admission control |
| 5: initialize empty set s |
| 6: for slot k(1 ≤ k ≤ M) do |
| 7:    if k = 1 or some links newly finished then |
| 8:       s = FindConcurrentSet(G, s, p) |
| 9:    end if |
| 10:    B(:, k) = s |
| 11:    B(:, k) = B(:, k − 1) |
| 12: end for |
| 13: return B |

In Algorithm 1, RBR can be used to iteratively find the proper node into concurrent set. With priority assigned with each link, it is desired that the concurrent set should contain larger total priority values. To ensure the performance of the RBRS, embodiments seek to show that the total priority values within the concurrent transmission set are at least as much as some lower bound.

Proposition 1: If assuming $x_i > 0$; $y_i \geq 0, \forall 1 \leq i \leq n$, embodiments have $$\sum_i \frac{y_i^2}{x_i} \geq \frac{(\sum_i y_i)^2}{\sum_i x_i} \quad (15)$$

Proof: By using Cauchy-Schwarz inequality, $(\sum_i a_i^2)(\sum_i b_i^2) \geq (\sum_i a_i b_i)^2$ and assigning $$a_i = \sqrt{x_i}, \ b_i = \frac{y_i}{x_i},$$

embodiments can get the result.

To analyze the total priority value a concurrent set can produce, first the total priority value the graph G contains as P can be defined, and the priority degree is defined as the regret benefit ratio in Equation 13.

$$pd(v,G) = r_v. \quad (16)$$

In accordance, the average priority degree can be defined as the following:

$$\overline{P}_d(G) = \frac{\sum_{v \in G} p_v p_d(v, G)}{P}. \quad (17)$$

Let $G_i$ be the subgraph induced by the remaining vertices at the beginning of the i-th iteration. In addition, p(G) means the total priority values within the graph G. The total priority values within a concurrent set can be defined to be YG, which can be expressed as the following:

$$YG = \sum_i P_{vi} \quad (18)$$

where one node is picked at i-th step.

Embodiments have the following theorem.
Theorem 2:

$$YG \geq \frac{P}{\overline{P}_d(G) + 1} \quad (19)$$

Proof: By definition:

$$P_d(G) * P = \sum_{v \in G} P_v P_d(v, G) \quad (20)$$

$$\geq \sum_i \sum_{v \in N_{Gi}^+(v)} P_v * P_d(v, G_i)$$

$$\geq \sum_i \sum_{v \in N_{Gi}^+(v)} P_v * P_d(v_i, G_i)$$

$$= \sum_i p(N_{Gi}^+(v)) * p_d(v_i, G_i)$$

Since $P = \sum_i p(N_{Gi}^+(v))$, the following can be deduced:

$$(\overline{P}_d(G) + 1) * P \geq \sum_i \frac{p(N_{Gi}^+(v))^2}{P_{vi}} \quad (21)$$

Finally, Proposition 1 can be applied with $x_i = p_{vi}$, $y_i = p(N_{Gi}^+(v))$. The inequality $$(\overline{P}_d(G) + 1) * P \geq \frac{P^2}{YG} \quad (22)$$

holds, which implies the theorem.

In the CSMA/CA settings, the QoS is no longer a restricted requirement, but a desirable objective. In addition, the system also wants to let the number of links that achieve its QoS to be large. If one link, which has low desirable throughput, continues to take up the channel, it will kill other transmissions and drag down the total performance. On the other hand, if one has high demand but low chance to transmit, it will kill itself. Thus, a proper situation should be that all links intelligently behave according to their demand and their actual situation in the contented graph, so that they all achieve their objective.

Embodiments provide a practical Distributed Regret Benefit Ratio Scheduler (D-RBRS) to solve the scheduling problem under CSMA/CA framework. Embodiments of the subject invention adjust the back of window with new Regret Benefit Ratio. Without the global knowledge introduced by the central scheme, the D-RBRS collects the contention information with neighbor detection algorithm. After that, it implements the regret benefit ratio with the back-off window mechanism.

In the distributed network, centralized control is not allowed. For every base station that sends traffic, the probability for channel acquisition is dependent on the size of contention window it utilizes on the MAC layer, which can be denoted as CW. Intuitively, it is desired that CW is smaller if its traffic has a higher priority to acquire the channel.

Because the QoS awareness and the contention are still the key aspects for the distributed scenario, the concept of regret benefit ratio can be reused to determine the priority of the traffic. That is, the following equation can be used:

$$CW \propto RBR = \frac{\text{regret}}{\text{benefit}}. \quad (23)$$

However, if the definition of RBR in the centralized scheme is reused in Equation (13), it is required to acquire others' priority information. This may require extra header for overhearing, which incurs overhead. To make a solution simple to implement and consistent with existing CSMA/CA MAC scheme, the two components can be redefined, benefit and regret, respectively. For the benefit value, it can be defined positively relative to the desired QoS. Intuitively, if this value is large, it should be assigned more chance for such link. The regret value is defined as number of contented neighbors, which is easy to obtain with our neighbor detection algorithm. Instead of directly computing RBR, the benefit and regret component can be separated and then two window mapping processes can be used to map different RBR to CW.

In order to effectively calculate the regret value, each station needs to keep track of how many other stations that can potentially cause interference to the station. One straightforward way to conduct neighborhood detection could be that every node periodically broadcasts beacon signal to its neighbors. If the other node is able to receive such beacon signal, then it knows it has one neighbor that could possibly in the interference range. However, because interference only occurs when nodes are transmitting, such active signaling mechanism can cause unnecessary overhead over time. The increased overhead will not only impact the performance of the network, but it also increases the energy consumption. Embodiments of the subject invention can eliminate such overhead by setting up an overhearing mechanism at each base station.

The neighborhood detection algorithm works as follows. At time slot t, each base station $b_i$ counts the number of distinct sources for links not destined to $b_i$ by letting the NIC operate in promiscuous mode. Therefore, when a nearby base station $b_j (j \neq i)$ sends a packet, base station $b_i$ is able to detect the signal and effectively count $b_j$ as its neighbor. The detailed procedure is described in Algorithm 3.

---
Algorithm 3 Neighborhood Detection
---
Each base station does the following:
Output: the number of interfering neighbors detected.
1:    Enable promiscuous mode;
2:    Define and initialize a neighbor set N;
3:    while received a packet p do
4:        src = source address of p;
5:        dest = destination address of p;
6:        if dest is not a broadcast address then
7:            Define $b_{src}$ as the base station that sent packet p;
8:            Add $b_{src}$ to neighbor set N;
9:        end if
10:   end while
11:   return size of N;

---

While a signal in the mmWave band is more concentrated and less likely to cause interference in a large range, it is still not uncommon that interference does happen when several base stations are located in densely deployed small cells and, in the meantime, the directional antennas' orientation is also set within the interfering side-lobe or main-lobe area. Thus, for a base station $b_i$, there could simultaneously be several neighbor base stations contending for the same channel. This will cause the degradation of network throughput if the system doesn't take measures to mitigate the problem. The D-RBRS of embodiments of the subject invention is designed for this task. The D-RBRS is able to schedule links according to a base station's contention level, which is positively proportional to its number of neighbors.

In an embodiment, eight priority levels indexed from 0 to 7 can be defined. The larger index number represents higher priority level and vice-versa. Each priority level has parameters of minimum contention window size (CWmin) and maximum contention window size (CWmax). The configuration of these parameters is shown in Table II.

For a specific priority, the CWmin and CWmax regulate the back-off behavior of current contending base station. When contention occurs, similar to CSMA/CA mechanism, the scheduler will initialize a random back-off window of size within CWmin and CWmax. If contention still occurs after back-off, the scheduler will double the size of current back-off window until it reaches CWmax and will keep it at CWmax until reset. The back-off procedure continues. Generally, the average size of back-off window determines how contentious current base station is. The larger the size of back-off window, the longer the base station will wait to try to initiate next transmission, thus exhibiting less contentious behavior, and vice-versa.

This fact can be used to configure the CWmin and CWmax parameters with respect to their associated priority levels. For contention resolving purposes, the base stations can be operating in lower priority level to be less contentious.

TABLE II

CONTENTION WINDOW PRIORITIZATION

| | Priority | | | | | | | |
|---|---|---|---|---|---|---|---|---|
| | 0 | 1 | 2 | 3 | 4 | 5 | 6 | 7 |
| CWmin | 512 | 256 | 128 | 64 | 32 | 16 | 8 | 3 |
| CWmax | 1023 | 511 | 255 | 127 | 63 | 31 | 15 | 7 |

Thus, they can be assigned with relatively larger CWmin and CWmax values. Vice-versa, the base stations with higher priority levels can be assigned with smaller CWmin and CWmax values. Furthermore, the system/method can also try to adjust CWmin and CWmax to make each priority level more distinct and disparate from one another, such that, for a given priority level i, the probability that the randomized back-off window size will overlap with that of priority level $j (j \neq i)$ will be reduced to a minimum. Table II shows the exact configuration of these parameters, where the system/method can completely eliminate the possible back-off window size overlapping between different priority levels.

Based upon the prioritized contention window configuration in Table II, a Coarse-to-Fine Window Mapping (CFWM) algorithm can be provided. Namely, the CFWM is a two-phase process. In the coarse-phase, the algorithm addresses the regret, while in the fine-phase, benefit is accommodated.

First, the contention degree $d_c^i$ is defined as the number of neighboring base stations a base station $b_i$ detects. The value of $d_c^i$, will be calculated by Algorithm 3 described above. The CFWM can work by assigning priority level to the current schedule according to its base station $b_i$'s contention degree $d_c^i$. This can be defined as coarse phase of the CFWM, which is illustrated in Algorithm 4.

---
Algorith 4 Priority Level Computation (Coarse)
---
Input: contention degree $d_c^i$ for base station $b_i$.
Output: the corresponding priority level.
1:        Define $P_i$ as the priority level to be assigned for base station $b_i$;
2:        if $d_c^i > 7$ then
3:            $P_i$ +32 +0 0;

| Algorith 4 Priority Level Computation (Coarse) |
| --- |
| 4:     else |
| 5:        $P_i = 7 - d_c^i$; |
| 6:     end if |
| 7:     return $P_i$; |

Referring to Algorithm 4, the scheduler always tries to assign higher priority level to base station $b_i$ that has a smaller value of contention degree $d_c^i$. In such a case, because the base station has a lower number of neighbors contending with it (smaller value of contention degree), it is more likely that this base station is able to fulfill the QoS requirement and increase the overall network throughput of the system. Thus, the CFWM will assign it with a higher priority level. On the other hand, if base station $b_i$ has a larger value of contention degree, the CFWM will assign it with a lower priority level, which tends to curb the sending rate of base station $b_i$. In practice, the number of contention neighbors a base station potentially has usually would not exceed 7, so the linear mapping between contention degree and priority level (line 2-5 in Algorithm 4) can be believed to be reasonable. For cases where contention degree does exceed 7, the CFWM just assigns priority level 0, the lowest, to the corresponding base stations.

In essence, each priority level determines the contention window adjustment strategy. The lower the priority level is, the larger CWmin/CWmax will be set, which leads to a less contentious base station. It is also true vice-versa. The rationale behind this mechanism is that the system always wants the least contending base station to transmit first, because the less contending a base station is, the higher throughput the base station can potentially create. The experimental results discussed herein also support this rationale.

The priority level assignment procedure described in Algorithm 4 only considers the contention between base stations, which is the regret. The more neighbors a base station $b_i$ has, the more contending $b_i$ becomes, and the lower priority level $b_i$ will be assigned. Another important issue is QoS-awareness (benefit) of the D-RBRS. On top of the scheduling scheme in Algorithm 4, embodiments equip the D-RBRS with QoS scheduling capability which is described in Algorithm 5. This can be defined as a fine phase of the CFWM.

In Algorithm 5, the CFWM tries to make a finer contention window parameter adjustment based on QoS, which is the benefit. According to the QoS-aware schedule policy, the higher QoS a link has, the sooner it needs to be scheduled in order to achieve optimal throughput over the network. The CFWM achieves this purpose by adjusting the CWmin and CWmax value according to the QoS inside current priority level Pi. As discussed above, CWmin and CWmax determine the range within which the size of contention window could be. Although not guaranteed, statistically, when CWmin or CWmax increases, the back-off time for current DCF will become longer since the probability to randomize a larger back-off slot number becomes higher. Therefore, when a link with higher QoS priority needs to be scheduled, Algorithm 5 will return a decreased CWmax and CWmin value (line 3 and line 4 of Algorithm 5), which essentially leads to a shorter back-off time. This will make the link be able to have much larger probability to be scheduled earlier than its contending counterparts if there are any.

| Algorithm 5 |
| --- |
| Contention Window Adjustment (Fine) |
| Input: |
|    $P_i$ - current priority level at base station $b_i$; |
|    $q_f$ - desired throughput of link f; |
|    $\alpha$ - scaling parameter; |
|    $\beta$ - window size. |
| Output: |
|    $CW_{min}$ - the adjusted CWmin value. |
|    $CW_{max}$ - the adjusted CWmax value. |
| 1: Retrieve CWmin and CWmax values with respect to $P_i$; |
| 2: Let $f(t) = \dfrac{2}{1+e^{-\alpha t}} - 1$; |
| 3: $CW_{max}$ = CWmin + $f(q_f) \cdot$ (CWmax − CWmin); |
| 4: $CW_{min}$ = max ($CW_{max} = \beta$, CWmin); |
| 5: return $CW_{min}$ and $CW_{max}$. |

Algorithm 4 and Algorithm 5 together constitute the cornerstone of the CFWM algorithm of certain embodiments of the subject invention. They work cooperatively to schedule links according to both their contention degree and QoS (i.e., regret and benefit). When a base station $b_i$ has a link to send, the CFWM will first retrieve appropriate priority level by referring to Algorithm 4 with contention degree information. Then, the CFWM will continue to run Algorithm 5 to set proper CWmin and CWmax values for scheduler's back-off window inside current priority level. Results returned from Algorithm 4 indicates which priority level current link should be associated with, while Algorithm 5 further deals with the exact values of CWmin and CWmax inside that priority level. Thus, Algorithm 4 can be called coarse phase while Algorithm 5 can be called fine phase. That is how the CFWM deals with both contention issue and QoS-awareness in a unified framework.

The window mapping mechanism cannot deal with the competition between links that share the same source node. For example, when the system has two links starting from A, denoted as $L_{AB}$ and $L_{AC}$, respectively, the packets that head for B will be contained in a different queue from packets heading for C. In addition, the system needs some mechanism to decide which packets go first. For example, the source node can rank the links according to their RBR directly computed by Equation (23), and then do a simple query starting from the best candidate. The query itself can be achieved by beacons.

In many embodiments, admission control is desired because the QoS is a hard requirement. In the distributed design, although QoS is best-effort oriented, if the actual achievable throughput is much lower than the desired one, the terminal is allowed to terminate the transmission.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A wireless system, comprising:
a plurality of directional antennas; and
a scheduler scheduling multiple links between the plurality of directional antennas,
wherein the scheduler schedules the multiple links concurrently in the same time slot based on Regret Benefit Ratio (RBR).

Embodiment 2. The wireless system according to embodiment 1, wherein the RBR is a single indicator combining contention for one of the directional antennas and Quality of Service (QoS).

Embodiment 3. The wireless system according to embodiment 2, wherein the scheduler introduces a contention graph for the directional antennas that captures a global knowledge of interference.

Embodiment 4. The wireless system according to any of embodiments 2-3, wherein the scheduler assigns a priority to each of the multiple links out of QoS considerations.

Embodiment 5. The wireless system according to embodiment 4, wherein the scheduler assigns the priority as an inverse of a number of slots that a link needs in a channel time allocation period (CTAP) to achieve its QoS requirement.

Embodiment 6. The wireless system according to embodiment 2, wherein the scheduler produces the RBR by using a metric incorporating both a contention graph for the directional antennas and a priority to the multiple links.

Embodiment 7. The wireless system according to embodiment 6, wherein the metric is expressed as the following Formula 1:

$$r_v = \frac{\sum_{i \in N_G(v)} P_i}{P_v} \quad \text{Formula 1}$$

where, $r_v$ is the RBR, $N_G(v)$ is a neighbor set of link v, and $P_v$ is the priority.

Embodiment 8. The wireless system according to embodiment 7, wherein the scheduler selects a link from the contention graph to add to a scheduling set and removes an unqualified link from the contention graph.

Embodiment 9. The wireless system according to embodiment 8, wherein the unqualified link satisfies that it has achieved QoS requirement, that it has been scheduled and ongoing now, or that it is a neighbor of one of the ongoing link.

Embodiment 10. The wireless system according to embodiment 9, wherein the scheduler iteratively selects a link with smallest RBR from the contention graph and adds the selected link to the scheduling set.

Embodiment 11. The wireless system according to embodiment 10, wherein the scheduler divides a slot into a number of stages.

Embodiment 12. The wireless system according to embodiment 11, wherein an end of the stages is a finished slot in which a scheduling link achieves QoS requirement.

Embodiment 13. The wireless system according to embodiment 12, wherein one of the directional antennas directs a beam towards another of the directional antennas.

Embodiment 14. The wireless system according to embodiment 13, wherein the directional antennas are equipped in a base station.

Embodiment 15. A distributed network system, comprising;
a pair of directional antennas facing each other and providing a link configured to transmit data from source to destination;
a beacon coordinating the pair of directional antennas; and
a scheduler adjusting a back-off window for the link with Regret Benefit Ratio (RBR) and collecting a contention information.

Embodiment 16. The distributed network system according to embodiment 15, wherein the RBR is expressed as the following Formula 2:

$$CW \propto RBR = \frac{\text{regret}}{\text{benefit}} \quad \text{Formula 2}$$

where the benefit is a Quality of Service (QoS), the regret is a number of contended neighbors, and the CW is a contention window Embodiment 17. The distributed network system according to embodiment 16, wherein the number of contended neighbors are determined by a beacon signal periodically broadcasted by the beacon.

Embodiment 18. The distributed network system according to embodiment 17, further comprising an omni-directional antenna for the beacon.

Embodiment 19. The distributed network system according to embodiment 18, wherein the scheduler schedules the link according to a base station's contention level that is proportional to the number of the contended neighbors.

Embodiment 20. The distributed network system according to any of embodiments 16-18, wherein the scheduler initializes a random back-off window of size within a minimum contention window size (CWmin) and a maximum contention window size (CWmax), wherein the CWmin and the CWmax are parameters of each priority level.

Embodiment 21. The distributed network system according to embodiment 20, wherein the scheduler adjusts CWmin and CWmax such that a probability that a randomized back-off window size of a given priority level i overlaps with that of priority level j (j≠i) is reduced to minimum.

Embodiment 22. The distributed network system according to embodiment 16, wherein the scheduler maps the RBR to the CW by using a two-phase process.

Embodiment 23. The distributed network system according to embodiment 22, wherein the scheduler maps the regret in a coarse-phase of the two-phase process and maps the benefit in a fine-phase of the two-phase process.

Embodiment 24. The distributed network system according to embodiment 23, wherein the scheduler defines a contention degree as the number of contended neighbors in the coarse-phase.

Embodiment 25. The distributed network system according to embodiment 24, wherein the scheduler assigns a priority level to a current schedule according to the contention degree of a base station.

Embodiment 26. The distributed network system according to embodiment 25, wherein the scheduler adjusts CWmin and CWmax according to the QoS inside the priority level in the fine-phase.

Embodiment 27. The distributed network system according to embodiment 26, wherein the scheduler decreases the CWmin and the CWmax such that the decreased CWmin and the decreased CWmax lead to a shorter back-off time.

Embodiment 28. The wireless system according to any of embodiments 1-14 or the distributed network system according to any of embodiments 15-27, wherein the scheduler performs Algorithm 1 (as defined herein).

Embodiment 29. The wireless system according to any of embodiments 1-14 or 28 or the distributed network system according to any of embodiments 15-27 or 28, wherein the scheduler performs Algorithm 2 (as defined herein).

Embodiment 30. The wireless system according to any of embodiments 1-14 or 28-29 or the distributed network system according to any of embodiments 15-27 or 28-29, wherein the scheduler performs Algorithm 3 (as defined herein).

Embodiment 31. The wireless system according to any of embodiments 1-14 or 28-30 or the distributed network system according to any of embodiments 15-27 or 28-30, wherein the scheduler performs Algorithm 4 (as defined herein).

Embodiment 32. The wireless system according to any of embodiments 1-14 or 28-31 or the distributed network system according to any of embodiments 15-27 or 28-31, wherein the scheduler performs Algorithm 5 (as defined herein).

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

EXAMPLE 1

A backhaul network with 10 base stations, which have at most 90 links, was considered. Because the scheduling performance is dependent on the location of stations, a position for each BS within a 1000 square meter area was generated. Meanwhile, for every link, its source and destination were randomly chosen. The requested throughput for this link is uniformly distributed between 1 Gbps and 3 Gbps. For the path loss, the channel model of Ref [12] was used. The realistic directional antenna model in Ref [13] was adopted. These two references [12,13] are hereby incorporated by reference herein in their entireties. All the BSs in the system used the same transmission power level. Some other parameters are shown in Table III. The experiments were conducted on MATLAB™.

TABLE III

| SIMULATION PARAMETERS | | |
|---|---|---|
| system bandwidth | W | 1.2 GHz |
| transmission power | $P_t$ | 30 dbm |
| background noise | $N_0$ | −134 dmb/MHz |
| slot time | $t_{slot}$ | 18 μs |
| beacon period | $t_{BP}$ | 50 μs |
| random access period | $t_{CAP}$ | 800 us |
| Number of slots in transmission period | M | 2000 |

The serial TDMA and the state-of-the-art protocol STDMA [10] were implemented for comparison. To evaluate the protocol of the subject invention, the following metrics were considered:

Number of successful links: the number of links that achieve the required QoS. Note that if a link has been scheduled but cannot satisfy the QoS, it was counted as successful a link.

System throughput: the achieved total throughput of the backhaul network. In other words, this metric is the average of sum of the throughputs of all links.

Experiments were designed to study the scheduling algorithm performance under different number of links and different number of slots in a superframe. To reduce random error for each experiment, the same experiment was repeated 50 times and the average results were calculated and taken.

In the first experiment, the number of slots in CTAP was chosen as 2000, and $\sigma=10^{-4}$ and the number of links in the backhaul network was varied from 10 to 90. With the increasing number of demanding links, the two metrics were evaluated and the results plotted.

Figure 2A:
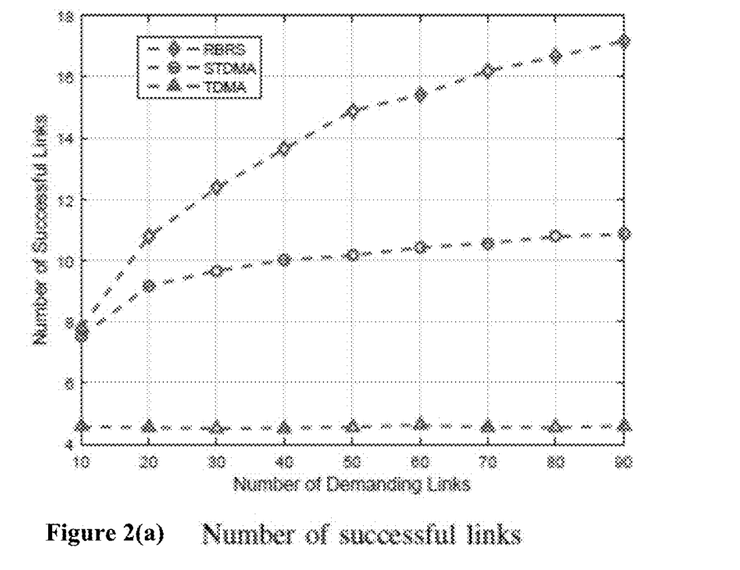
FIG. 2(a) shows an experimental successful links according to an embodiment of the subject invention.
Figure 2B:
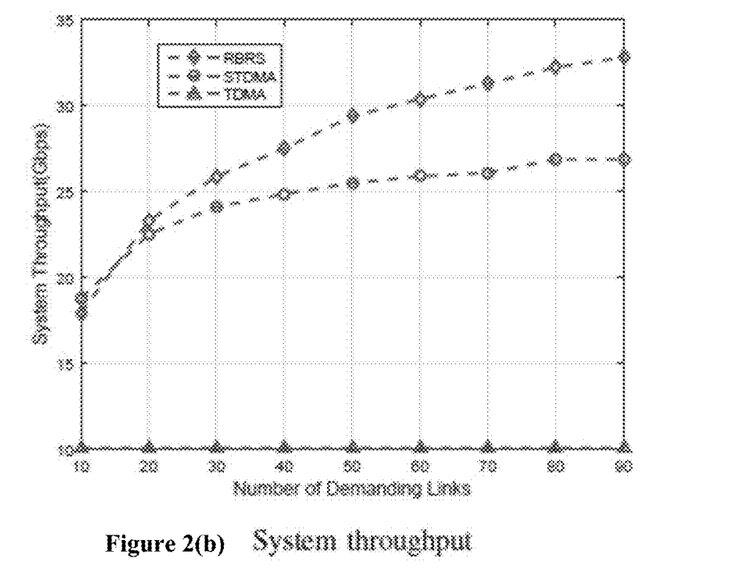
FIG. 2(b) shows an experimental system throughput according to an embodiment of the subject invention.

FIGS. 2(a) and 2(b) show experimental successful links and an experimental system throughput according to an embodiment of the subject invention. Referring to FIGS. 2(a) and 2(b), it is possible to observe the trend of the performance of the RBRS under the increasing number of demanding links. The more demanding links there are, the more chances for the spatial reuse, and thus both the number of successful links and the system throughput keep increasing. Due to the system capacity constraint, they gradually became flat and reached the capacity.

Compared with TDMA and STDMA, the RBRS has obvious advantages. TDMA has no spatial reuse at all so it can only schedule limited links. When only a few links are to be scheduled, the difference between STDMA and the RBRS is trivial because both schemes can accommodate almost all the demanding links. As the number of demanding links increases, the RBRS can achieve better performance in two aspects. First of all, when the number of demanding links is around 10 to 20, the performance of STDMA has already entered the flattened phase where a higher number of links will not result in increased performance; however, the embodiment of the subject invention keeps increasing dramatically until the number of demanding links reaches 80. Moreover, when the traffic demand is large, the RBRS can achieve around 60% more successful links and about 40% higher system throughput than STDMA.

The better performance of the RBRS comes from two factors. First, it uses global contention knowledge to make scheduling. For STDMA, a new link will be added to a scheduling set as long as it can increase the total throughput. This method may get stuck to bad local optimal, where highly contented links are co-scheduled. In the RBRS, the links that are relatively independent with each other are scheduled, and thus closer to the global optimal. Second, the QoS of a link is considered as a priority in the RBRS, and contributes to the overall performance.

In the second experiment, the performance of different protocols was compared using different numbers of slots in CTAP. The number of demanding links was kept at 90. The experiment changed the number of slots in CTAP from 500 to 5000, and evaluated the two metrics as before.

Figure 3A:
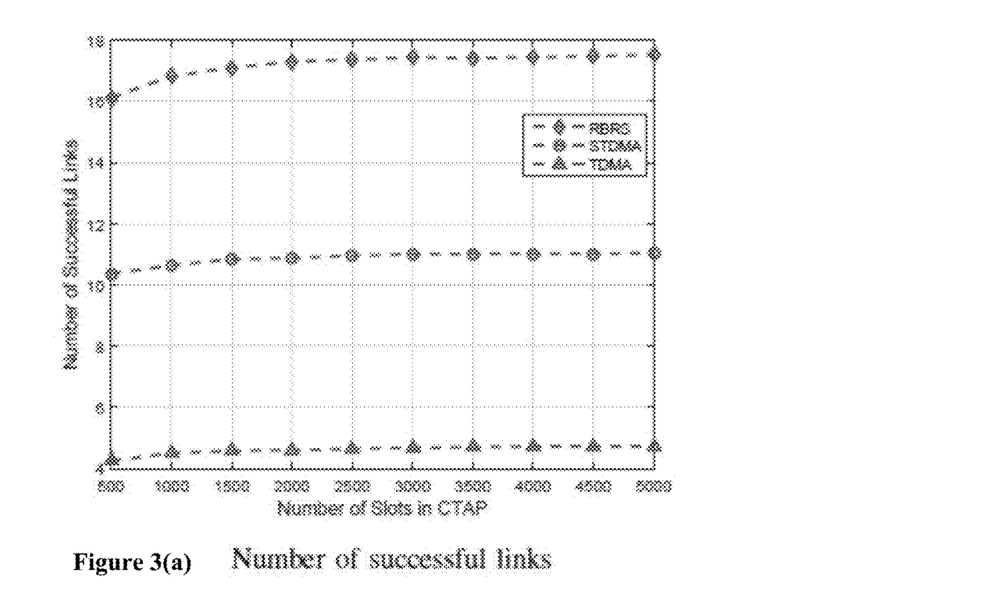
FIG. 3(a) shows an experimental successful links according to an embodiment of the subject invention.
Figure 3B:
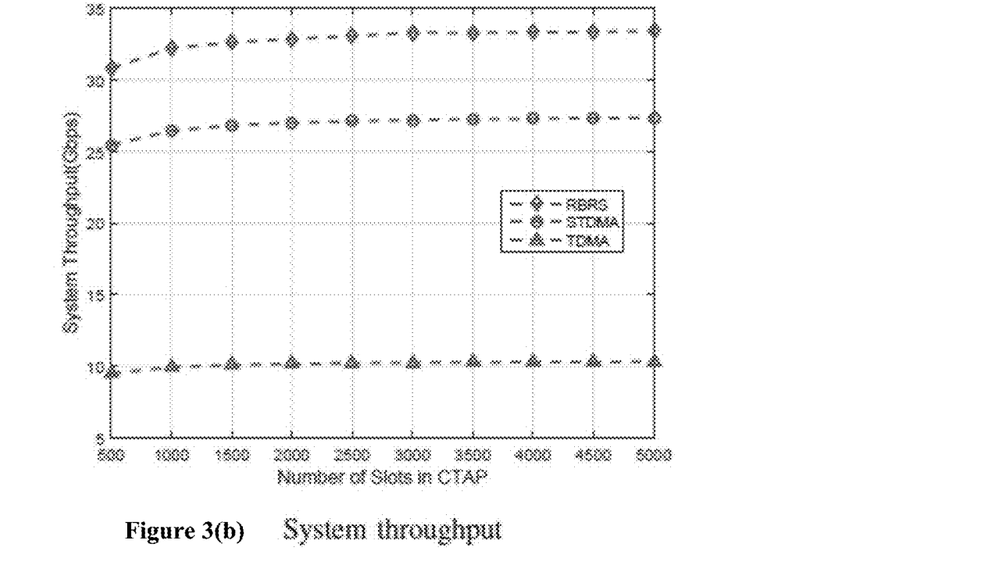
FIG. 3(b) shows an experimental system throughput according to an embodiment of the subject invention.

FIGS. 3(a) and 3(b) show an experimental successful links and an experimental system throughput according to an embodiment of the subject invention. Referring to FIGS. 3(a) and 3(b), the number of successful links and system throughput only slightly increased as the number of slots in CTAP changes. With enough time slots, the RBRS can achieve 17 successful links while STDMA can only schedule around 11 links. Besides, the system throughput of the RBRS is 10 Gbps higher than that of STDMA.

EXAMPLE 2

For performance evaluation of the D-RBRS, a backhaul network was considered to include 10 base stations (nodes) randomly distributed over a 1000 square meters area. Each base station is equipped with directional antennas as well as quasi omni-directional antennas. And for each node, the directional antenna model as described in [13] was implemented. The beamwidth of the directional antennas was set to 30 degrees, and the channel was set to work on the 73 GHz band. On top of directional antenna model, the D-RBRS was implemented. The simulation system was developed under NS-3 ([19], which is hereby incorporated by reference herein in its entirety). For consistency, the range of the demanding throughput of links was set to be the same as before. For parameters such as system bandwidth, power, and noise, the configuration of Table III was reused.

For performance comparison, the optimal D-RBRS scheme proposed in [15] was used and a default 802.11 random access scheme was used as a baseline. To evaluate the scheme of embodiments of the subject invention, the two following metrics were considered again as the centralized control:

Number of successful links: Although the throughput requirement is elastic, more links are required to achieve the objective.

System throughput: System throughput is a key performance metric. By throughput, the overall point-to-point throughput on the whole backhaul network is implied.

Experiments were designed to study the scheduling algorithm performance under different number of links and different number of packets in each link. To reduce random error for each experiment, the same experiment was repeated 10 times and the average results were calculated and taken.

With respect to effects of number of links, the number of links was varied in range of 10 to 90. Each link is a data stream that contains 100 packets. Once the number of links is determined, these links are generated and added randomly among the base stations. For each base station, one packet is scheduled to be generated and sent from transport layer in every 30 milliseconds, i.e., the sending interval. The elapsed time, between the moment when the first packet of the whole network was sent at the transport layer and the moment when the last packet of the whole network was successfully received at one base station, was recorded. Then the overall system throughput was calculated for each scheme. The number of successful links and throughput performance of each scheme for different number of links were recorded. Finally, the comparison results were plotted.

Figure 4A:
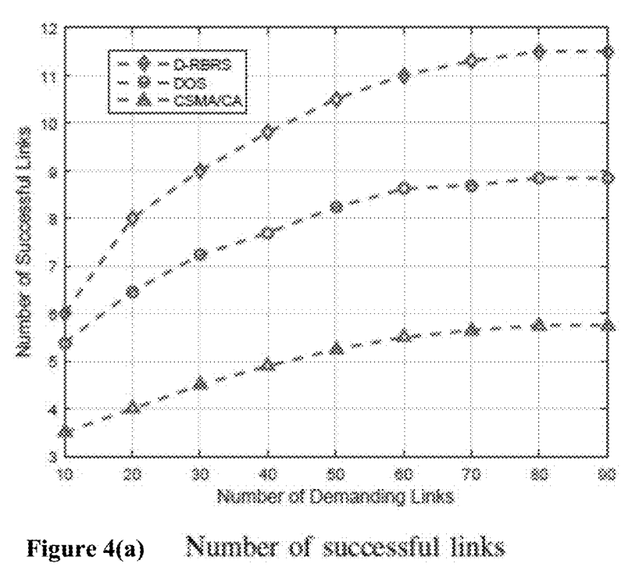
FIG. 4(a) shows a simulation result for a number of successful links according to an embodiment of the subject invention.
Figure 4B:
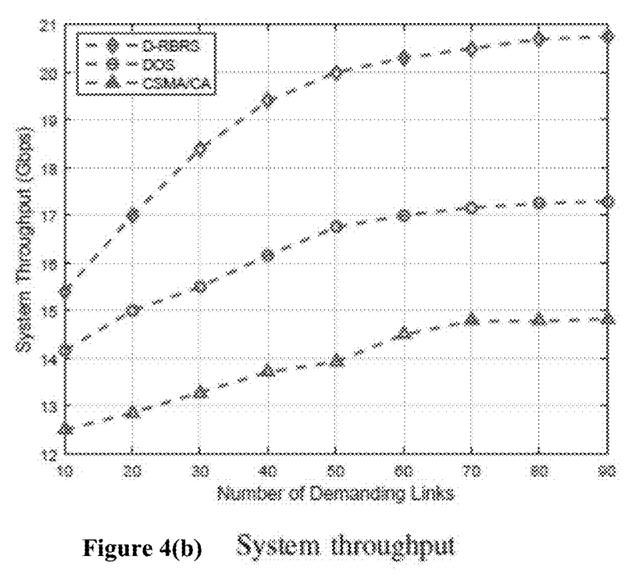
FIG. 4(b) shows a simulation result for a system throughput according to an embodiment of the subject invention.

FIGS. 4(a) and 4(b) show simulation results for a number of successful links and a system throughput according to an embodiment of the subject invention.

Referring to FIGS. 4(a) and 4(b), with RBR exploited, the D-RBRS achieves a higher number of successful links. 30% more links can achieve their desired throughput than DOS under full demanding links. Thanks to the coarse-to-fine hierarchical structure of the D-RBRS, the scheduler is able to make best use of the available contention window values and assigns them to links according to both their contention and QoS priorities.

In addition, the D-RBRS achieves the best performance in terms of system throughput among all of the three schemes. It achieved an average of 20% throughput gain over DOS and 40% over 802.11. This is because the contention between different links with different priorities can be reduced to a minimum.

The D-RBRS is better suited for a practical environment. DOS does not achieve the best performance although it is theoretically thought to be optimal. This is due to the fact that DOS relies on highly accurate past channel estimation to determine the current scheduling scheme. However, in a practical environment, it is difficult to achieve such an accurate channel estimation in real time. This makes the D-RBRS perform much better than DOS.

With respect to effects of numbers of packets in each link, 90 links were randomly added in the system and, the number of packets for each link was varied from 100 to 1000. Other setups remained the same as described above in Example 1. For the throughput calculation, as above, the elapsed time between the moment when the first packet of the whole network was sent at the transport layer and the moment when the last packet of the whole network was successfully received at one base station was recorded.

Figure 5A:
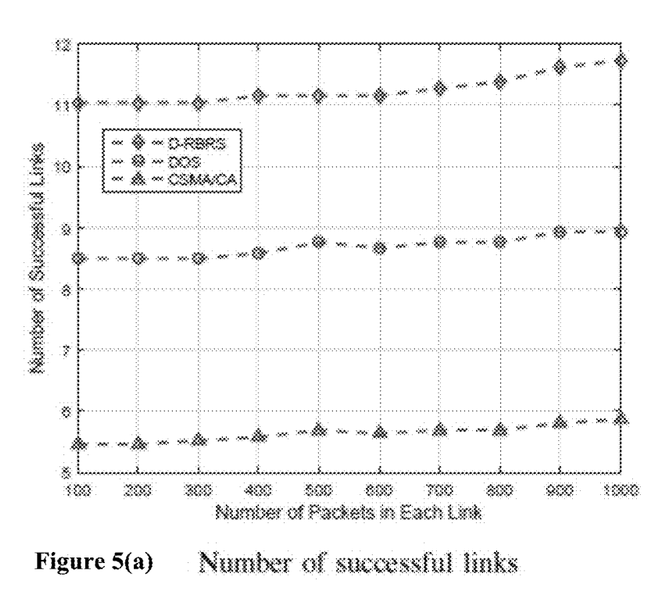
FIG. 5(a) shows a simulation result for a number of successful links according to an embodiment of the subject invention.
Figure 5B:
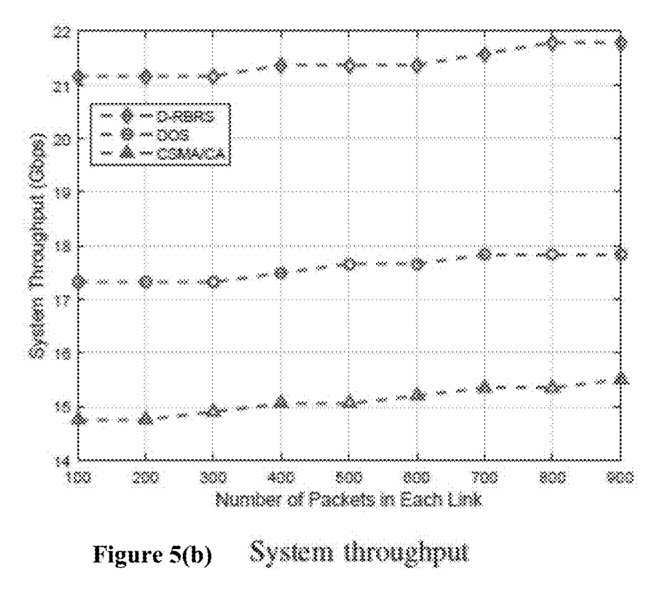
FIG. 5(b) shows a simulation result for a system throughput according to an embodiment of the subject invention.

FIGS. 5(a) and 5(b) show simulation results for a number of successful links and a system throughput according to an embodiment of the subject invention. Referring to FIGS. 5(a) and 5(b), with more packets in each link, the successful links and system throughput increase slowly for all three schemes. However, the D-RBRS of embodiments of the subject invention can achieve three more successful links than DOS and double the performance of pure CSMA/CA. In terms of throughput gain, embodiments of the subject invention can achieve 20% gain over DOS and 40% gain over 802.11 as the number of packets increases. These results are consistent with those in FIGS. 4(a) and 4(b). The general trend is that when the number of packets in each link increases, the overall system throughput also increases. This is because more transmitted data will decrease the percentage of overhead such as link setup time, and it will converge.

Comparing with the performance of the RBRS, the D-RBRS has some performance degradation. This makes sense since the distributed control lacks the knowledge of global information and CSMA/CA will incur unwanted back off by its nature. Both RBRS and D-RBRS can achieve good performance in their own settings.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

REFERENCES

[1] "Qualcomm data challenge," accessed March 2015, https://www.qualcomm.com/documents/risingmeet-1000x-mobile-data-challenge.
[2] R. Baldemair, T. Irnich, K. Balachandran, E. Dahlman, G. Mildh, Y. Seln, S. Parkvall, M. Meyer, and A. Osseiran, "Ultra-dense networks in millimeter-wave frequencies," IEEE Communications Magazine, vol. 53, no. 1, pp. 202-208, January 2015.
[3] M. N. Islam, A. Sampath, et. al., "Wireless backhaul node placement for small cell networks," in 2014 48th Annual Conference on Information Sciences and Systems (CISS) (Princeton, USA), Mar. 19-21, 2014, pp. 1-6.
[4] J. Wang, Z. Lan, C. Pyo, T. Baykas, C. Sum, M. Rahman, J. Gao, R. Funada, F. Kojima, and S. Kato, "Beam codebook based beamforming protocol for multi-Gbps millimeter-wave WPAN systems," IEEE J. Selected Areas in Communications, vol. 27, no. 8, pp. 1390-1399, October 2009.
[5] Taori, Rakesh, and Arun Sridharan, "Point-to-multipoint in-band mmwave backhaul for 5G networks." Communications Magazine, IEEE 53.1 (2015): 195-201.
[6] J. Qiao, X. S. Shen, J. W. Mark, Q. Shen, Y. He, L. Lei, "Enabling device-to-device communications in millimeter-wave 5G cellular networks," IEEE Communications Magazine vol. 53, no. 1, pp. 209-215, January 2015.
[7] Niu, Yong, et al. "Exploiting Device-to-Device Communications in Joint Scheduling of Access and Backhaul for mmWave Small Cells." (2015).
[8] L. X. Cai, L. Cai, X. Shen, and J. W. Mark, "REX: a Randomized EXclusive Region based Scheduling Scheme for mmWave WPANs with Directional Antenna," IEEE Trans. Wireless Commun., vol. 9, no. 1, pp. 113-121, January 2010.
[9] J. Qiao, L. X. Cai, and X. Shen, et. al., "Enabling multi-hop concurrent transmissions in 60 GHz wireless personal area networks," IEEE Transactions on Wireless Communications, vol. 10, no. 11, pp. 3824-3833, November 2011.
[10] Qiao, Jian and Cai, Lin X and Shen, Xuemin and Mark, Jon W, "STDMA-based scheduling algorithm for concurrent transmissions in directional millimeter wave networks," IEEE International Conference on Communications (ICC), pp. 5221-5225, 10-15 Jun. 2012.
[11] S. Y. Geng, J. Kivinen, X. W. Zhao, and P. Vainikainen, "Millimeterwave propagation channel characterization for short-range wireless communications," IEEE Trans. Veh. Technol., vol. 58, no. 1, pp. 3-13, January 2009.
[12] Akdeniz, Mustafa Riza and Liu, Yuanpeng and Samimi, Mathew K and Sun, Shu and Rangan, Sundeep and Rappaport, Theodore S and Erkip, Elza, "Millimeter wave channel modeling and cellular capacity evaluation," IEEE Journal on Selected Areas in Communications, vol. 32, pp. 1164-1179, June 2014.
[13] Toyoda, I., T. Seki, and K. Iiguse, "Reference antenna model with side lobe for TG3c evaluation." IEEE document, pp. 802-15, 2006.
[14] I. K. Son, S. Mao, M. X. Gong, and Y. Li, "On frame-based scheduling for directional mmWave WPANs," in Proc. IEEE INFOCOM (Orlando, Fla.), Mar. 25-30, 2012, pp. 2149-2157.
[15] D. Zheng, W. Ge and J. Zhang, "Distributed Opportunistic Scheduling for Ad Hoc Networks With Random Access: An Optimal Stopping Approach," IEEE Trans. Information Theory, vol. 55, no. 1, pp. 205-222, January 2009.
[16] M. X. Gong, R. Stacey, D. Akhmetov, and S. Mao, "A directional csma/ca protocol for mmwave wireless pans," in IEEE Wireless Communications and Networking Conference (WCNC), 2010. IEEE, 2010, pp. 1-6.
[17] M. X. Gong, D. Akhmetov, R. Want, and S. Mao, "Directional csma/ca protocol with spatial reuse for mmwave wireless networks," in IEEE Global Telecommunications Conference (GLOBECOM 2010), 2010. IEEE, 2010, pp. 1-5.
[18] K. Lee, Y. Kim, K. Shin, J. Kwon, and C.-H. Kang, "A dynamic cap allocation algorithm using directional antennas in ieee 802.15. 3c wpans," in 13th International Conference on Advanced Communication Technology (ICACT), 2011. IEEE, 2011, pp. 296-299.
[19] NS-3, "Ns-3," 2015, [accessed 13 Oct. 2015]. [Online]. Available: https://www.nsnam.org/

What is claimed is:
1. A wireless system, comprising:
a plurality of directional antennas; and
a scheduler for scheduling multiple links between the plurality of directional antennas,
wherein the scheduler schedules the multiple links concurrently in a same time slot based on a plurality of Regret Benefit Ratios (RBRs), wherein each RBR of the plurality of RBRs is associated with a link of the multiple links, wherein each RBR of the plurality of RBRs is a single ratio calculated based on contention between a link of the multiple links and contended neighbors of the link and a Quality of Service (QoS) of the link, and wherein contention between the link and contended neighbors of the link is determined based at least in part on a count of the contended neighbors.
2. The wireless system according to claim 1, wherein the contended neighbors of the link comprise one or more links that cause interference to the link at a level higher than a threshold under concurrent transmissions.
3. The wireless system according to claim 1, wherein the scheduler consults a contention graph for the plurality of directional antennas, and wherein the contention graph comprises a global knowledge of interference.
4. The wireless system according to claim 1, wherein the scheduler assigns a priority to each link of the multiple links based on a QoS requirement for the link.
5. The wireless system according to claim 4, wherein the scheduler assigns the priority as an inverse of a number of slots that a link needs in a channel time allocation period (CTAP) to achieve a QoS requirement for the link.
6. The wireless system according to claim 1, wherein the scheduler calculates each RBR of the plurality of RBRs by using a contention graph for the plurality of directional antennas and a priority for each link of the multiple links.
7. The wireless system according to claim 6, wherein an RBR of a link v is expressed as the following Formula 1:

$$r_v = \frac{\sum_{i \in N_G(v)} P_i}{P_v} \quad \text{Formula 1}$$

where, $r_v$ is the RBR of link v, $N_G(v)$ is a neighbor set of link v, and $P_v$ is a priority of link v.

8. The wireless system according to claim 7, wherein the scheduler selects a link from the contention graph to add to a scheduling set and removes an unqualified link from the contention graph.

9. The wireless system according to claim 8, wherein the unqualified link satisfies one or more of that it has achieved a QoS requirement for the unqualified link, that it has been scheduled and is currently ongoing, or that it is a neighbor of an ongoing link.

10. The wireless system according to claim 9, wherein the scheduler iteratively selects a link with a smallest RBR from the contention graph and adds the selected link to the scheduling set.

11. The wireless system according to claim 10, wherein the scheduler divides a slot into a number of stages.

12. The wireless system according to claim 11, wherein an end of the number of stages is a finished slot in which a scheduling link achieves a QoS requirement for the scheduling link.

13. A distributed network system, comprising;
- a pair of directional antennas facing each other and providing a link configured to transmit data from a source to a destination;
- a beacon coordinating the pair of directional antennas; and
- a scheduler adjusting a back-off window for the link based on a Regret Benefit Ratio (RBR) for the link, wherein the RBR for the link is determined based at least in part on a Quality of Service (QoS) for the link and a number of contended neighbors of the link.

14. The distributed network system according to claim 13, wherein the RBR is expressed as the following Formula 2:

$$CW \propto RBR = \frac{\text{regret}}{\text{benefit}}, \quad \text{Formula 2}$$

where benefit is a Quality of Service (QoS), regret is a number of contended neighbors, and CW is a contention window.

15. The distributed network system according to claim 14, wherein the scheduler initializes a random back-off window size within a minimum contention window size (CWmin) and a maximum contention window size (CWmax), wherein the CWmin and the CWmax are parameters of a priority level associated with the source.

16. The distributed network system according to claim 15, wherein the scheduler adjusts CWmin and CWmax such that a probability that a randomized back-off window size of a given priority level i overlaps with that of priority level j ($j \neq i$) is reduced to minimum.

17. The distributed network system according to claim 14, wherein the scheduler maps the RBR to the CW by using a two-phase process.

18. The distributed network system according to claim 13, wherein the number of contended neighbors is determined using a beacon signal periodically broadcasted by the beacon.

19. The distributed network system according to claim 18, further comprising an omni-directional antenna for the beacon.

20. The distributed network system according to claim 19, wherein the scheduler schedules the link according to a base station's contention level that is proportional to the number of contended neighbors.

\* \* \* \* \*